United States Patent [19]

Fujino et al.

[11] 3,907,766

[45] Sept. 23, 1975

[54] L-ASPARTYL-AMINOMALONIC ACID DIESTER

[75] Inventors: Masahiko Fujino, Takarazuka; Mitsuhiro Wakimasu, Suita; Nobuo Nakajima, Nishinomiya; Hisashi Aoki, Suita, all of Japan

[73] Assignee: Takeda Chemical Industries, Ltd., Osaka, Japan

[22] Filed: July 6, 1973

[21] Appl. No.: 377,138

[30] Foreign Application Priority Data
July 17, 1972 Japan.............................. 47-71464
July 19, 1972 Japan.............................. 47-72954

[52] U.S. Cl............................... 260/112.5; 426/217
[51] Int. Cl.².................... C07C 103/52; A23L 1/22
[58] Field of Search................................. 260/112.5

[56] References Cited
UNITED STATES PATENTS

| 3,492,131 | 1/1970 | Schlatter.......................... 260/112.5 |
|---|---|---|
| 3,769,333 | 10/1973 | Lapidus et al................... 260/112.5 |
| 3,798,204 | 3/1974 | Nakajima et al.................. 260/112.5 |
| 3,798,206 | 3/1974 | Uchiyama et al................ 260/112.5 |
| 3,799,918 | 3/1974 | Mazur.............................. 260/112.5 |
| 3,808,190 | 4/1974 | Dahlmans et al................ 260/112.5 |
| 3,833,553 | 9/1974 | Ariyoshi et al................... 260/112.5 |

OTHER PUBLICATIONS

E. Schroder and K. Lubke, "The Peptides," Vol. 1, Academic Press, New York (1965), pp. 122–124.

*Primary Examiner*—Lewis Gotts
*Assistant Examiner*—Reginald J. Suyat
*Attorney, Agent, or Firm*—Wenderoth, Lind & Ponack

[57] ABSTRACT

A novel dipeptide, L-aspartyl-aminomalonic acid alkyl fenchyl diester, and its physiologically acceptable salts which are useful as a sweetener, and production thereof and sweetening compositions containing the dipeptide ester or its salt.

1 Claim, No Drawings

L-ASPARTYL-AMINOMALONIC ACID DIESTER

This invention relates to a novel dipeptide ester, L-aspartyl-aminomalonic acid alkyl fenchyl diester, and its physiologically acceptable salts which are useful as a sweetener, the dipeptide ester having the formula

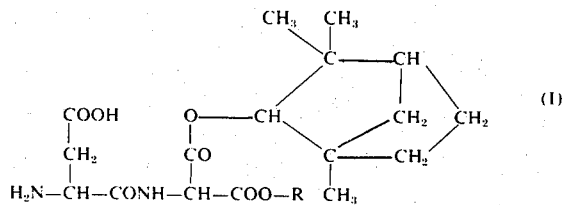

wherein R stands for a methyl or ethyl group.

In the course of extensive studies on sweeteners, the present inventors suceeded in the synthesis of the novel compound (I) and found (1) that the compound (I) shows astonishingly strong sweetness when compared with that of sucrose, (2) that the sweetness of the compound (I) is of high quality which is free from bitterness produced by the known sweeteners (e.g., saccharin sodium), (3) that the fenchyl group is essential for the sweetness of the compound (I) and (4) that the compound (I) is safe for use as a sweetener.

On the basis of the unexpected findings, the present inventors have made further studies on the compound (I) and completed the invention.

The principal object of the present invention is to provide the compound (I) and its physiologically acceptable salts.

The second object of the present invention is to provide a process for production of the compound (I) and its salts.

Another object of this invention is to provide sweetening compositions containing the compound (I) or its salt as a main ingredient.

Further object of the present invention is to provide foods sweetened by the compound (I) or its salt.

The present compound (I) is produced by a process conventional per se in the field of peptide synthesis and typical examples are mentioned below:

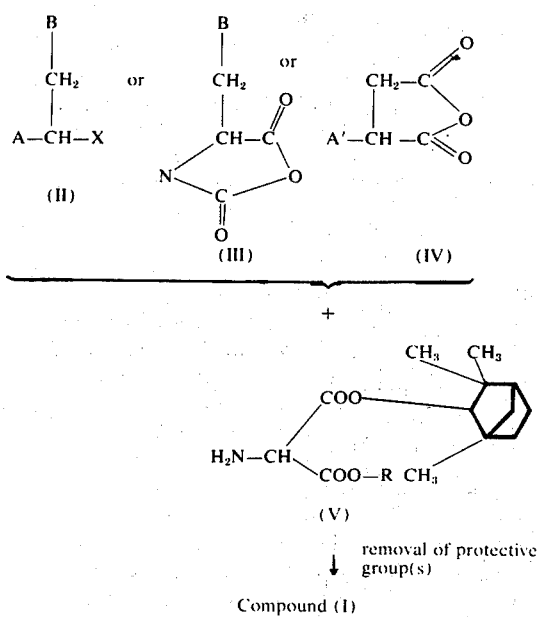

A,A': protected amino group
B : protected carboxyl group
X : carboxyl group which may be activated
R : methyl or ethyl group The starting compound (V) is prepared, for instance, by reacting N-protected aminomalonic acid monoalkyl ester with fenchol and removing the protective group in a manner per se conventional.

The compound (I) is prepared, for example, by reacting the compound (II), (III) or (IV) with the compound (V) and removing the protective group(s) from the resulting compound.

The protective group of the protected amino group A or A' in the formula (II) or (IV) is a group that may be ultimately removed by deblocking reactions. A number of such removable protective groups have been developed in the field of peptide synthesis and may be suitably utilized in the present process. Examples of the protective groups of the protected amino group are benzyloxycarbonyl, t-butyloxycarbonyl, p-chlorobenzyloxycarbonyl, t-amyloxycarbonyl, formyl and so forth. It should be additionally noted that as the group A', there may be mentioned a group represented by Y—NH$_2$— wherein Y is a strong acid such as an inorganic acid (e.g., hydrogen chloride or hydrogen bromide) or an organic acid (e.g., benzenesulfonic acid or p-toluenesulfonic acid).

The protective group of the protected carboxyl group B in the formula (II) or (III) may be selected from among the numerous groups which have heretofore been established. Examples of such groups are benzyl, p-nitrobenzyl, p-chlorobenzyl, t-butyl and so forth.

As to the activated carboxyl group represented by X, there also have been reported a number of species and, here again, these established species may be suitably employed in the present process. Such activated carboxyl groups may be exemplified by the corresponding chloride, azide, mixed anhydride with e.g., a carbonic acid monoalkyl ester and activated ester (e.g., p-nitrophenyl ester, 2,4,5-trichlorophenyl ester, pentachlorophenyl ester, N-hydroxysuccinimide ester, N-hydroxy-5-norbornene-2,3-dicarboximide or N-hydroxybenztriazole ester).

The present reaction is generally conducted at a low temperature of about −5°C to about 10°C. However, under certain circumstances, the reaction may be conducted either heating or at a lower temperature of about −50°C.

The reaction is generally conducted in the presence of a suitable solvent such as tetrahydrofuran, dioxane, dimethylformamide, methylene chloride, chloroform or a mixed solvent of any of the above solvents with water.

The compound (V) is employed in an amount approximately equimolar relative to the compound (II), (III) or (IV), though this ratio need not be strictly adhered to.

The present process may be conducted in the presence of a dehydrating agent such as carbodiimide reagent (e.g., dicyclohexylcarbodiimide or water-soluble carbodiimides). The dehydrating agent is employed generally in a molar amount equivalent to or twice that with respect to the theoretical amount of water that will be by-produced.

After the reaction has been completed, if the reaction product has protective group(s), such group(s) may be removed to yield the desired compound. In the field of peptide synthesis, there are available a number of expedient procedures for removal of protective groups, each procedure being tailored to one protective group or another and these established procedures may be utilized with advantage in the working of this invention.

For example, catalytic hydrogenolysis with palladium black or palladium-on-carbon may be mentioned. Generally these reactions proceed to a satisfactory extent at room temperature, though they may be conducted under cooling. These reactions are generally conducted in the presence of a suitable solvent. The solvent is exemplified by water, methanol, ethanol, dioxane, tetrahydrofuran, acetic acid, t-butanol, isopropanol and so forth.

After the above reactions, the product can be purified and isolated by procedures which are conventional per se, e.g., phasic transfer, concentration, chromatography, crystallization, recrystallization and the like.

While the objective compound (I) is in many instances obtained in the free form, it may be recovered as the corresponding acid addition salt of a mineral acid such as hydrochloric acid, sulfuric acid, hydroiodic acid or hydrobromic acid or of an organic acid, such as p-toluenesulfonic acid, trichloroacetic acid, trifluoroacetic acid or formic acid; the corresponding salt of an alkali metal such as sodium, potassium or lithium, or of an alkaline earth metal such as calcium or magnesium; or the corresponding ammonium salt.

The present compound (I) and its physiologically acceptable salts are useful as strong sweeteners and also as intermediates for the synthesis of various peptides.

EXPERIMENT 1

Each of the following dipeptide esters was diluted with water and the threshold values were determined by the method of limit. The results are set forth in Table 1.

Table 1

| Compound | Difference threshold (The lowest concentration at which the sample can be distinguished from distilled water) | Taste threshold (The lowest concentration at which the sample tastes sweet) |
| --- | --- | --- |
| L-Aspartylamino-malonic acid ethyl fenchyl diester | 0.00007 % | 0.00018 % |
| L-Aspartylamino-malonic acid methyl fenchyl diester | 0.00001 % | 0.00003 % |

EXPERIMENT 2

An organoleptic test was performed using the following aqueous solutions of dipeptide esters as reference samples and aqueous solutions containing sucrose in 5 different concentrations as matching samples. The panel consisted of 50 trained tasters. Probit analysis of the result gave the equivalent concentrations shown in Table 2.

Table 2

| Compound | Reference sample (%) | Equivalent concentration of sucrose relative to reference sample (%) | Magnitude (times) of sweetness relative to sucrose |
| --- | --- | --- | --- |
| L-Aspartylaminomalonic acid ethyl fenchyl diester | 0.0010 | 5.4 | 5400 |
|  | 0.0020 | 8.4 | 4200 |
| L-Aspartylaminomalonic acid methyl fenchyl diester | 0.00025 | 8.3 | 33200 |
|  | 0.0005 | 11.1 | 22200 |

The present compounds (I) are nontoxic, as found by toxicity tests using oral administration of the dipeptide compounds to mice (e.g., $LD_{50} > 2,000$ mg./kg.), and the compounds (I) can be used as such or added to foods in the same manner as the conventional sweetener, saccharin sodium.

The most effective amount of the compound (I) to be employed varies with the kind of foods to be sweetened, but is usually about 0.00001 to about 0.2% by weight relative to foods as ingested by mouth. An amount over 0.2% is superfluous for increasing sweetness and an amount below about 0.00001% is by itself not sufficient to sweeten foods.

It should be noted that an amount of the physiologically acceptable salt of the compound (I) is calculated in terms of the compound (I).

The foods to which this invention is applicable include various powdery, liquid and solid foods in which sweeteners are usually incorporated. For example, varieties of foods of farm, aquatic, forestal and animal origins such as alcoholic beverages (e.g., fruit wine, sweetened fruit wine), nonalcoholic beverages (e.g., fruit juices, imitation juices, fermented milk), instant foods (e.g., instant fruit juices, instant coffee), sauces, dressings, mayonnaise, ketchups, soups, premixed seasonings, bread, confections, biscuits, crackers, hot cake mix, chocolate, caramel, candies, chewing gum, jellies, puddings, candied fruits, vegetables, fresh cream, fruit jams, marmalades, flour paste, dairy products (e.g., formulated powdered milk, ice cream, etc.), sherbet; bottled vegetables, fruits, canned foods, agricultural gourmet foods, cooked farm vegetable produces, pickled farm produces, meat product (e.g., bacons, hams, sausages), compound condiments, compound sweeteners, luxury items (e.g., tobacco), various drugs (e.g., dentifrices), and so forth. In addition to these foods, this invention is applicable to all other foods only if the object of this invention can be accomplished.

As regards the mode of incorporation of the present dipeptide compounds into foods, any of the procedures routinely employed in the production of foods, such as blending, admixing, dissolution, soaking, impregnation, dusting, spraying, injection, etc., can be utilized.

As regards the timing of addition to foods, the present compounds (I) may be added in the course of production of such foods and, preferably, at a time towards the end of processing. In other words, they may be added in the same manner as saccharin sodium. For example, in the case of cooked foods such as a curry roux, the compounds are preferably added uniformly at the end of heating or after heating.

The compounds (I) themselves have a strong ability to sweeten foods and it is often difficult to weigh the necessary amount of the compound (I) to efficiently sweeten foods. Therefore, there is a demand to provide sweetening compositions in which the compound (I) is appropriately diluted. Such a composition convenient for handy and practical use is prepared by incorporating at least one compound (I) with a suitable solid carrier or liquid carrier which are known per se as adjuvants.

Such a solid carrier is exemplified by carboxymethylcellulose, glucose, lactose, dextrin, their mixture or the like. The liquid carrier is exemplified by water, ethanol propylene glycol, their mixture or the like.

It is also possible to use the present compounds (I) in combination with other known additives for foods, e.g., sweeteners (such as sucrose, fructose, glucose, ribose, xylose, sorbitol, maltitol, saccharin, glycine, alanine, glycyrrhizin, and the like), essences, food colors, and the like. Those additives are to be construed as "carrier" or "adjuvant" in the present invention.

For preparing the composition, any of conventional means are employed, and for example, the compounds (I) are formulated by mixing the compound (I) with the carrier or carriers into solid compositions (e.g., powders, granules and the like), liquid compositions (e.g., solutions, syrups and the like), etc.

The amount of the compound (I) and its physiologically acceptable salt to be incorporated in the sweetening composition is usually about 0.0001 to about 10% by weight of the composition, the amount of the salt being calculated in terms of the compound (I).

This invention will be further illustrated by way of examples.

EXAMPLE 1

1. Production of carbobenzoxyaminomalonic acid methyl fenchyl diester

In 20 ml. of dry ethyl ether is dissolved 2.68 g. of carbobenzoxyaminomalonic acid monomethyl ester and under cooling with ice and stirring, 2.29 g. of phosphorus pentachloride is added. Then, the mixture is stirred at room temperature for 30 minutes. On the other hand, 7.0 g. of pyridine is added to 3.08 g. of fenchyl alcohol and under cooling with ice and stirring, the acid chloride solution prepared above is added dropwise over a period of 30 minutes. Then, the mixture is stirred at room temperature for an additional hour, and the by-product pyridine hydrochloride is removed by filtration. The ethereal solution is first washed with a 10% aqueous solution of citric acid (30 ml. ×3), then with a saturated aqueous solution of sodium bicarbonate (30 ml. ×3) and finally with a saturated aqueous solution of sodium chloride. The solution is dried over anhydrous sodium sulfate and allowed to stand overnight. Finally, the solvent is evaporated under reduced pressure and the residue is purified by chromatography on a column of silica gel. The procedure gives a colorless oil. Yield 3.0 g. (74.4%)

2. Production of carbobenzoxy-$\beta$-benzyl-L-aspartyl-aminomalonic acid methyl fenchyl diester In 50 ml. of methanol is dissolved 2.02 g. of carbobenzoxyaminomalonic acid methyl fenchyl diester and a catalytic reduction is carried out at atmospheric pressure in the presence of palladium black for 4 hours. The catalyst is removed by filtration and the solvent is evaporated by vacuum distillation. The residue is dissolved in 20 ml. dioxane. On the other hand, 1.61 g. of carbobenzoxy-L-aspartic acid $\beta$-benzyl ester is dissolved in 20 ml. of dioxane and 0.90 g. of N-hydroxy-5-norbornene-2,3-dicarboximide is added. Under cooling with ice and stirring, 1.03 g. of dicyclohexylcarbodiimide is added.

Then, the mixture is stirred at room temperature for 4 hours. The by-product dicyclohexylurea is removed by filtration and the filtrate is added to the amine solution prepared above under cooling with ice and stirring. Then, the mixture is stirred at room temperature overnight. Next morning, the solvent is evaporated under reduced pressure and the residue is dissolved in 50 ml. of ethyl ether. The solution is first washed with a saturated aqueous solution of sodium bicarbonate (30 ml. ×3), a 10% aqueous solution of citric acid (30 ml. ×3) and a saturated aqueous solution of sodium chloride (30 ml. ×3) in the order mentioned. The solution is then dried over anhydrous sodium sulfate and allowed to stand overnight. Finally, the solvent is evaporated under reduced pressure and the residue is purified by chromatography on a column of silica gel. The procedure gives a colorless oil. Yield 2.47 g. (90.1%)

3. Production of L-aspartyl-aminomalonic acid methyl fenchyl diester

In 50 ml. of methanol is dissolved 1.45 g. of carbobenzoxy-$\beta$-benzyl-L-aspartyl-aminomalonic acid methyl fenchyl diester and a catalytic reduction is carried out at atmospheric pressure in the presence of palladium black for 5 hours. After the catalyst has been removed by filtration, the solvent is evaporated by vacuum distillation and the residue is dissolved in 20 ml. of benzene. The solution is filtered. The solvent is evaporated under reduced pressure and petroleum ether is added to the residue to give a white gel. Yield 0.75 g. (74.9%)

Melting point: 85°–88°C; $[\alpha]_D^{27}$ + 5.9° ($c$=1.0, in acetic acid:

Elemental analysis - calcd. for $C_{18}H_{28}O_7N_2 \cdot 2H_2O$: C, 51.42; H, 7.67; N, 6.66; found C, 51.52; H, 7.29; N, 6.30.

This product is 30,000 times as sweet as sucrose.

EXAMPLE 2

Production of L-asparty-aminomalonic acid methyl fenchyl diester

In 60 ml. of methanol is dissolved 4.03 g. of N-carbobenzoxyaminomalonic acid methyl fenchyl diester and a catalytic reduction is carried out at atmospheric pressure in hydrogen streams with a suitable amount of palladium black. After the palladium black has been removed by filtration, the methanol is evaporated by vacuum distillation, whereupon a colorless oil is obtained. This oil is dissolved in 50 ml. of methylene chloride and after the solution has been cooled to −50°C, 1.40 ml. of triethylamine is added.

Meanwhile, 1.59 g. of L-2,5-oxazolidinedione-4-acetic acid prepared by a conventional procedure is dissolved in 30 ml. of methylene chloride and, after the solution has been cooled to −50°C, it is added dropwise to the solution prepared above. The mixture is reacted at −50°C for 3 hours, and then at room temperature overnight. Next morning, the methylene chloride is evaporated under reduced pressure and the residue is dissolved in a small amount of water. The solution is then purified by chromatography on a column of Sephadex G-10. The water is evaporated under reduced pressure and a small amount of benzene is added, followed by further evaporation. Finally, 50 ml. of petroleum ether is added to the residue to give precipitates. Yield 1.19 g. (28.2%)

EXAMPLE 3

Production of L-aspartyl-aminomalonic acid methyl fenchyl diester

In exactly the same manner as Example 2, 4.03 g. of N-carbobenzoxyaminomalonic acid methyl fenchyl diester is catalytically reduced to give a colorless oil.

This oil is dissolved in 20 ml. of ethyl acetate and 1 ml. of a 2.5 M aqueous solution of potassium carbonate is added. Then, 2.49 g. of N-carbobenzoxy-L-aspartic anhydride prepared by a conventional procedure is added to the above solution at 20°C and the mixture is stirred for 2 hours. To the reaction mixture is added 30 ml. of water and the aqueous layer is washed with ethyl ether (20 ml. ×3) and acidified with 1N hydrochloric acid. The oil that has separated is extracted with ethyl ether (30 ml. ×3). The ethereal solution is dried over anhydrous sodium sulfate and the solvent is evaporated under reduced pressure, whereupon a colorless oil is obtained. The thin-layer chromatogram of this product shows that it is a mixture of $\alpha$- and $\beta$-peptides. This mixture is dissolved in 60 ml. of methanol and catalytically reduced at atmospheric pressure in hydrogen streams with palladium black. After the palladium black had been removed by filtration, the methanol is evaporated by vacuum distillation and 50 ml. of petroleum ether is added to the oily residue to give precipitates. Yield 3.07 g. (73.0%)

The thin-layer chromatogram of this product indicates that while it predominantly contains the $\alpha$-peptide, a small amount of the $\beta$-peptide is also contained therein.

This product is 20,000 times as sweet as sucrose and is sufficiently useful.

EXAMPLE 4

1. Production of carbobenzoxyaminomalonic acid ethyl fenchyl diester

In 20 ml. of dry ethyl ether is dissolved 2.81 g. of carbobenzoxyaminomalonic acid monoethyl ester and under cooling with ice and stirring, 2.29 g. of phosphorus pentachloride is added. The mixture is stirred at room temperature for 30 minutes. On the other hand, 7.0 g. of pyridine is added to 1.70 g. of fenchyl alcohol and under cooling with ice and stirring, the acid chloride solution prepared above is added dropwise over a period of 30 minutes. The mixture is stirred at room temperature for an additional hour, and the by-product pyridine hydrochloride is removed by filtration. The ethereal solution is first washed with a 10% aqueous solution of citric acid (30 ml. ×3), then with a saturated aqueous solution of sodium bicarbonate (30 ml. ×3) and finally with a saturated aqueous solution of sodium chloride. The solution is dried over anhydrous sodium sulfate and allowed to stand overnight. Finally, the solvent is evaporated under reduced pressure and the residue is purified by chromatography on a column of silica gel. The procedure gives a colorless oil. Yield 3.52 g. (84.1%)

2. Production of carbobenzoxy-$\beta$-benzyl-L-aspartylaminomalonic acid ethyl fenchyl diester In 50 ml. of ethanol is dissolved 2.20 g. of carbobenzoxyaminomalonic acid ethyl fenchyl diester and a catalytic reduction is carried out at atmospheric pressure in the presence of palladium black for 10 hours. The catalyst is removed by filtration and the solvent is evaporated by vacuum distillation. The residue is dissolved in 20 ml. of dioxane. On the other hand, 1.70 g. of carbobenzoxy-L-aspartic acid $\beta$-benzyl ester is dissolved in 20 ml. of dioxane and 0.85 g. of N-hydroxy-5-norbornene-2,3-dicarboximide is added. Under cooling with ice and stirring, 0.98 g. of dicyclohexylcarbodiimide is added.

The mixture is stirred at room temperature for 4 hours. The by-product dicyclohexylurea is removed by filtration and the filtrate is added to the amine solution prepared above under cooling with ice and stirring. The mixture is stirred at room temperature overnight. The solvent is evaporated under reduced pressure and the residue is dissolved in 50 ml. of ethyl ether. The solution is washed with a saturated aqueous solution of sodium bicarbonate (30 ml. ×3), a 10% aqueous solution of citric acid (30 ml.×3) and a saturated aqueous solution of sodium chloride (30 ml.×3) in the order mentioned. The solution is then dried over anhydrous sodium sulfate and allowed to stand overnight. Finally, the solvent is evaporated under reduced pressure and the residue is purified by chromatography on a column of silica gel. The procedure gives a colorless oil. Yield 2.14 g. (72.2%)

3. Production of L-aspartyl-aminomalonic acid ethyl fenchyl diester

In 50 ml. of ethanol is dissolved 1.55 g. of carbobenzoxy-$\beta$-benzyl-L-aspartyl-aminomalonic acid ethyl fenchyl diester and a catalytic reduction is carried out at atmospheric pressure in the presence of palladium black for 2.5 hours. After the catalyst has been removed by filtration, the solvent is evaporated by vacuum distillation and the residue is dissolved in 20 ml. of benzene. The solution is filtered. The solvent is evaporated under reduced pressure and petroleum ether is added to the residue to give a white gel. The gel is purified by chromatography on a column of silica gel to give the objective compound as powder. Yield 0.93 g. (83.7%)

Melting point: 132°–135°C; $[\alpha]_D^{30}$+4.8° (C=1.02, in acetic acid):

Elemental analysis - calcd. for $C_{19}H_{30}O_7N_2 \cdot H_2O \cdot \frac{1}{2}CH_3COOH$: C, 53.80; H, 7.68; N, 6.27; found C, 54.03; H, 7.80; N, 6.02.

This product is 4,000 times as sweet as sucrose.

EXAMPLE 5

Production of L-aspartyl-aminomalonic acid ethyl fenchyl diester

In 60 ml. of methanol is dissolved 4.17 g. of N-carbobenzoxyaminomalonic acid ethyl fenchyl diester and a catalytic reduction is carried out at atmospheric pressure in hydrogen streams in the presence of palladium black. After the palladium black has been removed by filtration, the methanol is evaporated by vacuum distillation, whereupon a colorless oil is obtained. This oil is dissolved in 50 ml. of methylene chloride and after the solution has been cooled to −50°C, 1.40 ml. of triethylamine is added. Meanwhile, 1.59 g. of L-2,5-oxazolidinedione-4-acetic acid is dissolved in 30 ml. of methylene chloride and, after the solution has been cooled to −50°C, it is added dropwise to the solution prepared above. The mixture is reacted at −50°C for 3 hours, and then at room temperature overnight. The methylene chloride is evaporated under reduced pressure and the residue is dissolved in a small amount of water. The solution is then purified by chromatography on a column of molecular sieve (Sephadex G-10, commercial product of Pharmacia AB, Sweden). The water is evaporated under reduced pressure and a small amount of benzene is added, followed by further evaporation. Finally, 50 ml. of petroleum ether is added to the residue to give precipitates. Yield 0.90 g. (21.7%)

EXAMPLE 6

Production of L-aspartyl-aminomalonic acid ethyl fenchyl diester

In the same manner as in Example 5, 4.17 g. of N-carbobenzoxyaminomalonic acid ethyl fenchyl diester is catalytically reduced to give a colorless oil.

This oil is dissolved in 20 ml. of ethyl acetate and 1 ml. of a 2.5 M aqueous solution of potassium carbonate is added. Then, 2.49 g. of N-carbobenzoxy-L-aspartic anhydride prepared by a conventional procedure is added to the above solution at 20°C and the mixture is stirred for 2 hours. To the reaction mixture is added 30 ml. of water and the aqueous layer is washed with ethyl ether (20 ml. ×3) and acidified with 1N hydrochloric acid. The oil that has separated is extracted with ethyl ether (30 ml. ×3). The ethereal solution is dried over anhydrous sodium sulfate and the solvent is evaporated under reduced pressure, whereupon a colorless oil is obtained. The thin-layer chromatogram of this product shows that it is a mixture of the $\alpha$- and $\beta$-peptides. The oil is dissolved in 60 ml. of methanol and catalytically reduced at atmospheric pressure in hydrogen streams with palladium black. After the palladium black had been removed by filtration, the methanol is evaporated by vacuum distillation and 50 ml. of petroleum ether is added to the oily residue to give precipitates. Yield 2.62 g. (63.0%)

The thin-layer chromatogram of this product indicates that while it predominantly contains the $\alpha$-peptide, a small amount of the $\beta$-peptide is also contained therein.

This product is 3,000 times as sweet as sucrose and is sufficiently useful.

EXAMPLE 7

To 1 kg. of powder composed of, by weight, 6% of 1/5 concentrated mandarin orange juice (race: Unshu), 5% of citric acid, 1.2% of powdery orange essence, 0.6% of vitamin C, 0.1% of natural color (carotene) and the balance of lactose is evenly added 0.03 g. of L-aspartyl-amino malonic acid methyl fenchyl diester and the mixture is compounded in the routine manner to prepare an orange juice powder. This product is satisfactory in both sweetness and flavor.

EXAMPLE 8

An apple jam is prepared in the routine manner using 1.5 kg. of apple pulp, which has been obtained by the routine procedure, 0.5 kg. of sucrose, 0.6 kg. of 75% sorbit solution, 0.01 kg. of carboxymethyl-cellulose sodium, 0.2 g. of L-aspartylamino-malonic acid ethyl fenchyl diester and 3 liters of water. This product is satisfactory in both sweetness and flavor.

EXAMPLE 9

A chocolate is prepared using, by weight, 23 parts of cacao paste, 17 parts of cacao butter, 25 parts of sucrose, 8 parts of sorbit powder, 18 parts of full-cream milk powder, 0.5 part of sucrose stearic acid ester, 1.0 part of milk essence, 0.5 part of strawberry essence and 0.01 part of L-aspartyl-aminomalonic acid ethyl fenchyl diester. This product has an excellent balance of sweetness and flavor and is delicious.

EXAMPLE 10

An ice cream is prepared in the routine manner using 2 kg. of fresh cream, 950 g. of skim milk powder, 500 g. of sorbit powder, 500 g. of millet jelly, 2 g. of sorbitan fatty acid ester, 3 g. of sodium alginate, 0.05 g. of L-aspartyl-aminomalonic acid methyl fenchyl diester, 5% of water and a small amount of vanilla essence. This product is excellent in both sweetness and flavor.

EXAMPLE 11

3 Kg. of concentrated fruit juice of orange (race Unshu), 0.5 kg. of sucrose, 1 kg. of sorbit powder, 5 g. of citric acid, 2 g. of vitamin C, 10 g. of orange essence and 0.05 g. of L-aspartyl-aminomalonic acid methyl fenchyl diester are dissolved in water to make the whole volume 10 l. The solution is sterilized at about 95°C for 20 seconds and sealed in bottles each 200 ml. capacity in a conventional manner to prepare an orange juice. This product is excellent in both sweetness and flavor.

EXAMPLE 12

In 20 l. of a mixed solution of 2 kg. of sorbit powder, 0.1 kg. of citric acid, 3 mg. of orange essence and 2 g. of vitamin $B_2$ is dissolved 1.0 g. of L-aspartylaminomalonic acid ethyl fenchyl diester. After the solution has been cooled to −4°C, it is distributed into brown pressure-resistant bottles of 230 ml. capacity, with carbon dioxide gas being bubbled in at a controlled internal pressure of 3 kg./cm². The resultant carbonated drink is excellent in both sweetness and flavor.

EXAMPLE 13

A tooth paste is prepared by the routine compounding procedure using, by weight, 50 parts of dicalcium phosphate, 28 parts of glycerin, 1.5 part of fatty acid monoglyceride, 1.5 part of sodium lauryl sulfate, 1 part of carboxymethylcellulose, 0.005 part of L-appartyl-aminomalonic acid ethyl fenchyl diester, a small amount of peppermint oil and 17.5 parts of water.

This product has a refreshing quality of sweetness and is spicy to the palate.

EXAMPLE 14

By the routine procedure of pharmacy, a vitamin A and D syrup is prepared using 300,000 I.U. of vitamin A (palmitate), 30,000 I.U. of vitamin D, 1.5 g. of polyoxyethylene (20) sorbitan monoleate, 0.1 g. of orange oil, 25 g. of sucrose, 1.5 g. of sorbit, 0.005 g. of L-aspartyl-aminomalonic acid methyl fenchyl diester and a sufficient amount of distilled water to make a total of 100 ml. This preparation has a refreshing quality of sweetness and is easy to take by mouth.

EXAMPLE 15

In the routine manner, ribose, lactose and L-aspartylaminomalonic acid ethyl fenchyl diester are evenly blended in the ratio of 50:49.6:0.4(parts by weight) to prepare a sweetening composition. This product is about 10 times as sweet as sucrose and its sweetness is of high quality.
What we claim is:
1. A compound selected from the group consisting of compounds of the formula
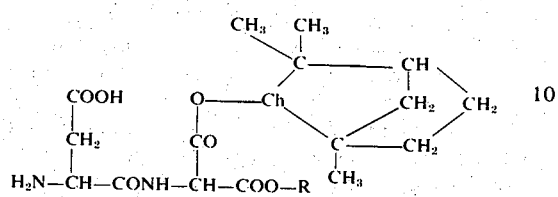
wherein R is methyl or ethyl, and physiologically acceptable salts thereof.
* * * * *